United States Patent
Bartlett et al.

(10) Patent No.: US 6,469,821 B2
(45) Date of Patent: Oct. 22, 2002

(54) MICROMIRROR STRUCTURES FOR ORTHOGONAL ILLUMINATION

(75) Inventors: Terry A. Bartlett, Dallas; Steven M. Penn, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/745,331

(22) Filed: Dec. 21, 2000

(65) Prior Publication Data

US 2002/0005979 A1 Jan. 17, 2002

Related U.S. Application Data

(60) Provisional application No. 60/173,406, filed on Dec. 28, 1999.

(51) Int. Cl.[7] .............................................. G02B 26/00
(52) U.S. Cl. ........................ 359/292; 359/290; 359/291; 359/224
(58) Field of Search ................ 359/290, 291, 359/248, 245, 292, 224, 226

(56) References Cited

U.S. PATENT DOCUMENTS

| | | | |
|---|---|---|---|
| 5,061,049 A | 10/1991 | Hornbeck | ................. 359/224 |
| 5,583,688 A | 12/1996 | Hornbeck | ................. 359/291 |
| 5,661,591 A * | 8/1997 | Lin et al. | ................. 359/290 |

* cited by examiner

*Primary Examiner*—Georgia Epps
*Assistant Examiner*—Tuyen Tra
(74) *Attorney, Agent, or Firm*—Charles A. Brill; Wade James Brady, III; Frederick J. Telecky, Jr.

(57) ABSTRACT

A micromirror device having an array of mirrors 802 formed with a jagged leading 804 and trailing 806 edge. The jagged leading and trailing edges eliminate the features that cause the most diffraction-straight edges that are perpendicular to the incident illumination 808. The leading and trailing edges preferably are formed as a series of saw teeth having a 45° angle to the incident illumination 808. Angling the edges relative to the illumination axis greatly reduces the diffraction that would occur from edges perpendicular to the illumination axis. By reducing the diffraction, the jagged leading and trailing edges enable the use of orthogonal illumination which reduces the cost, size, and weight of the associated TIR prism. The number of saw teeth can vary, but the three-tooth pattern provides an optimum mixture of low diffraction and ease of production.

18 Claims, 4 Drawing Sheets

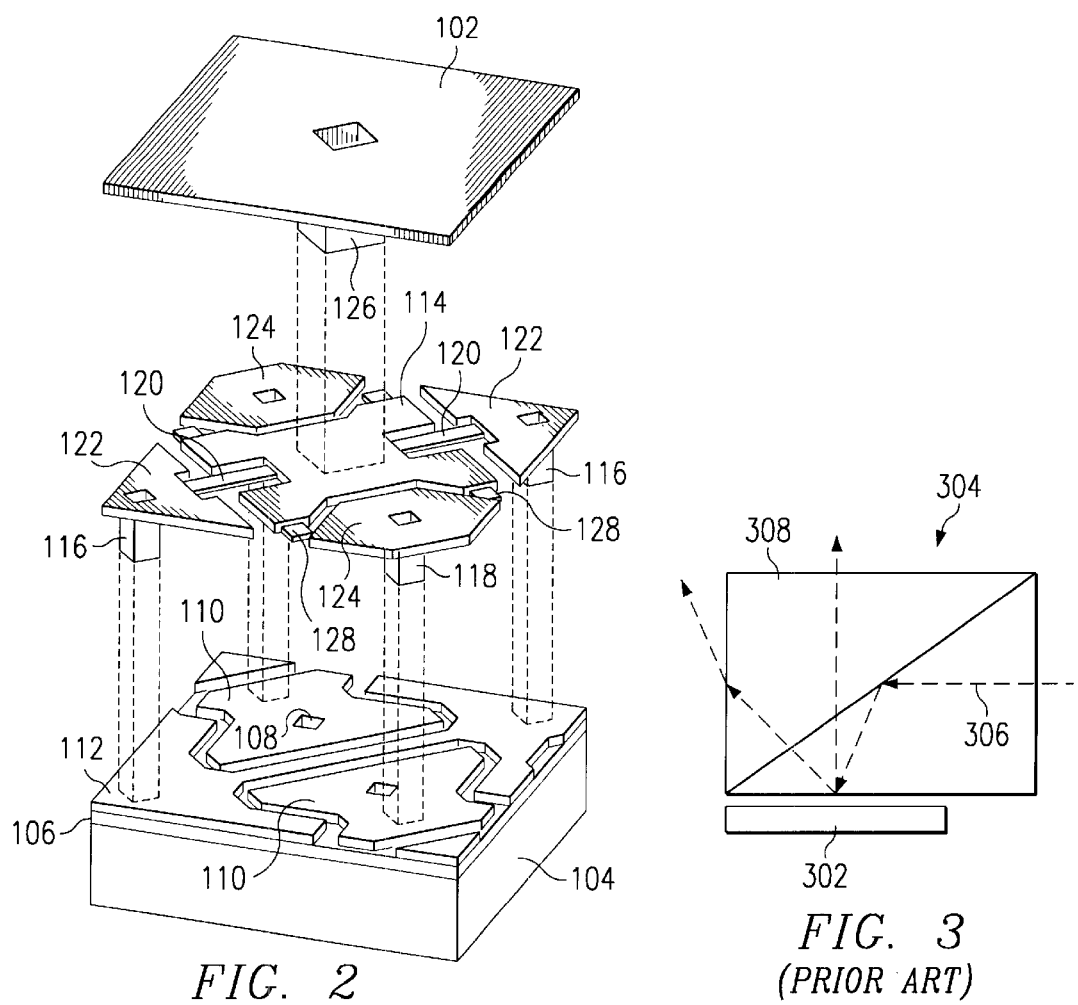
FIG. 2
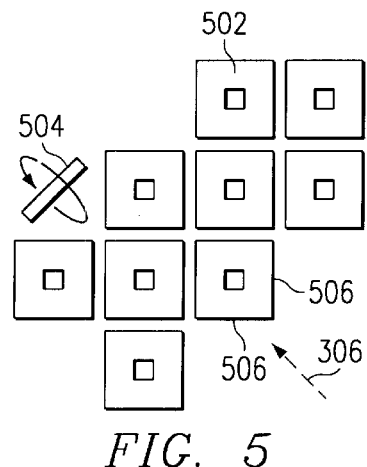
FIG. 3
(PRIOR ART)
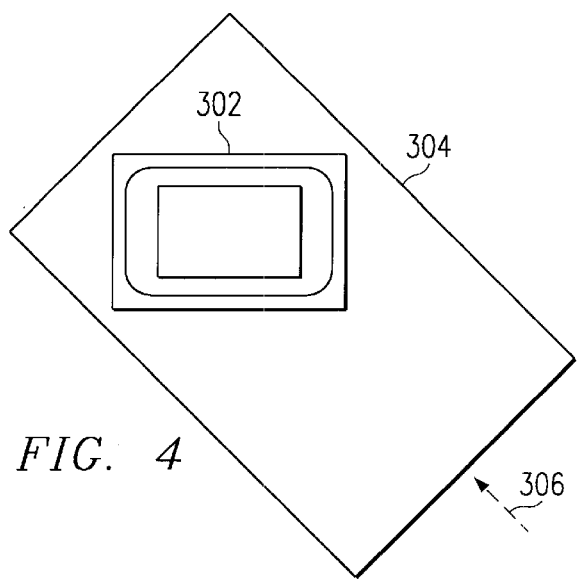
FIG. 4
FIG. 5

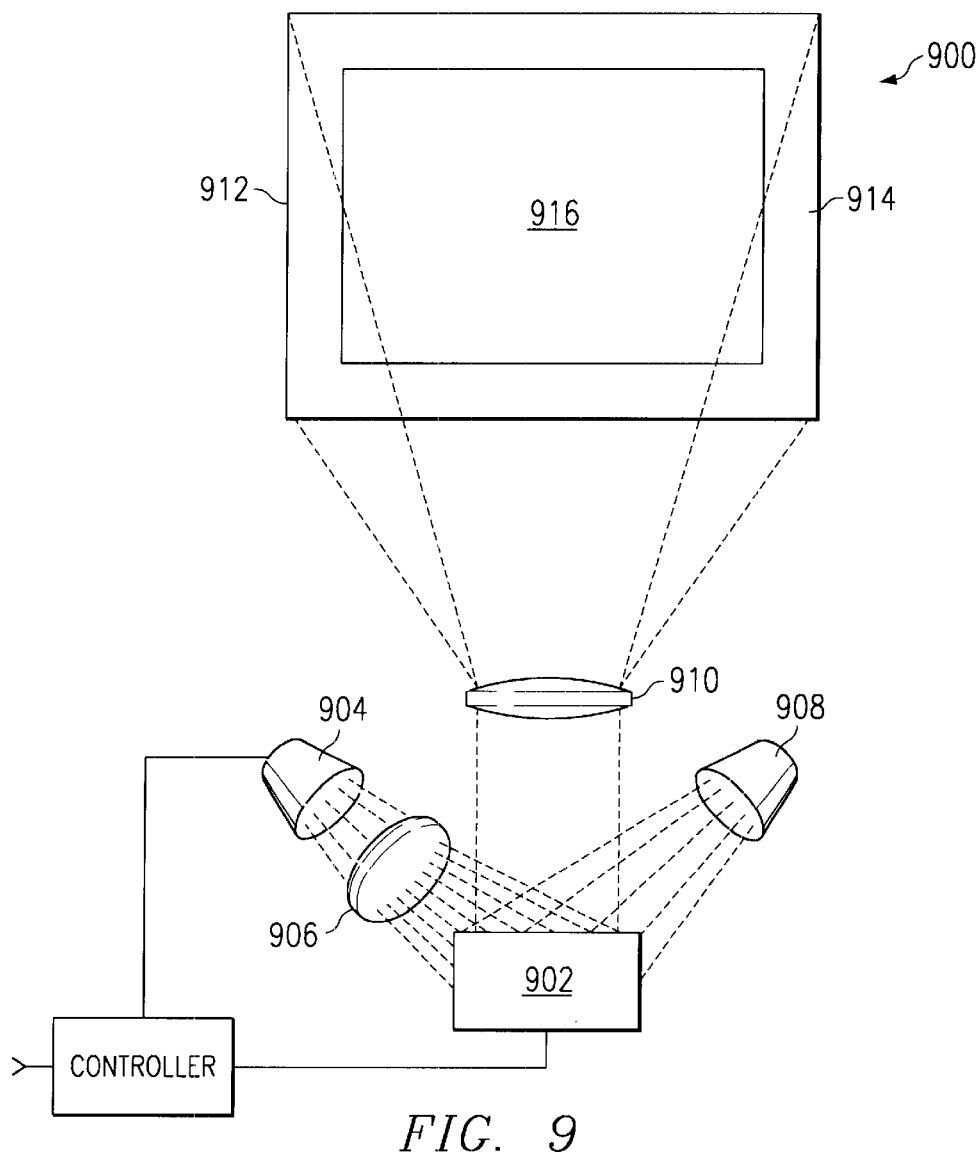
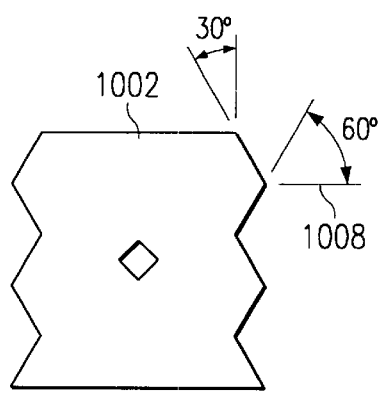
FIG. 10
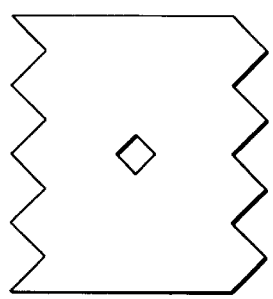
FIG. 11

MICROMIRROR STRUCTURES FOR ORTHOGONAL ILLUMINATION

This application claims priority under 35 USC§ 119(e)(1) of provisional application No. 60/173,406 filed Dec. 28, 1999.

CROSS-REFERENCE TO RELATED APPLICATIONS

The following patents and/or commonly assigned patent applications are hereby incorporated herein by reference:

U.S. Pat. Nos. 5,061,049 5,583,688

Filing Date Sep. 13, 1990 Dec. 21, 1993

Issue Date Oct. 29, 1991 Dec. 10, 1996

Title Spatial Light Modulator and Method Multi-Level Digital Micromirror Device

FIELD OF THE INVENTION

This invention relates to the field of micromirror display systems, more particularly to micromirror architectures designed to minimize the size of image projection systems.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits.

Digital micromirror devices (DMDs), sometimes referred to as deformable micromirror devices, are a type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator that uses digital image data to modulate a beam of light by selectively reflecting portions of the beam of light to a display screen. While analog modes of operation are possible, DMDs typically operate in a digital bistable mode of operation and as such are the core of the first true digital full-color image projection systems.

Micromirrors have evolved rapidly over the past ten to fifteen years. Early devices used a deformable reflective membrane which, when electrostatically attracted to an underlying address electrode, dimpled toward the address electrode. Schlieren optics illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the DMD surface. The rigid mirror remains flat while the hinges deform, minimizing the amount of light scattered by the device and improving the contrast ratio of the device.

Recent micromirror configurations, called hidden-hinge designs, further improve the image contrast ratio by fabricating the mirror on a pedestal above the torsion beams. The elevated mirror covers the torsion beams, torsion beam supports, and a rigid yoke connecting the torsion beams and mirror support, further improving the contrast ratio of images produced by the device. The small size of the micromirror array has enabled a remarkable reduction in the size and weight of image projectors. Projectors are now sold that weigh less than five pounds. Consumers desire yet further reductions in projector size and weight. New optical designs are needed to enable further reductions in the size and weight of image projectors.

SUMMARY OF THE INVENTION

Objects and advantages will be obvious, and will in part appear hereinafter and will be accomplished by the present invention which provides a method and system for orthogonal illumination of micromirror devices. One embodiment of the claimed invention provides a micromirror array designed for orthogonal illumination. The micromirror comprises: a substrate, addressing circuitry formed on the substrate, and an array of deflectable mirror elements formed over the substrate. The deflectable mirror elements rotate about an axis that is substantially parallel to at least one of a leading and trailing edge in response to the addressing circuitry. At least one of the leading and trailing edges—preferably both—are jagged. The jagged edge is typically formed by a series of saw tooth shapes. Three saw teeth provide a sufficiently jagged edge without complicating the fabrication of the micromirrors.

The jagged leading and trailing edges reduce the diffraction that would occur when using orthogonal illumination—that is, when the illumination axis is perpendicular to the axis of rotation. Orthogonal illumination requires a much smaller prism than the 45° illumination of the prior art. The smaller prism lowers the cost, size, and weight of the display system compared to the larger prisms of the prior art.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is an exploded perspective view of a single micromirror element from the micromirror array of FIG. 1.

FIG. 3 is a side view showing the use of a TIR prism assembly in conjunction with a micromirror array according to the prior art.

FIG. 4 is a plan view showing the alignment of the TIR prism and micromirror array of FIG. 3.

FIG. 5 is an enlarged view of a portion of the micromirror array of FIG. 4 showing the relationship between the illumination axis and the hinge axis.

FIG. 9 is a schematic view of a micromirror-based projection system utilizing an improved micromirror device according to one embodiment of the present invention.

FIG. 10 is a plan view of a single micromirror showing an alternative design and mirror angle.

FIG. 11 is a plan view of a single micromirror showing additional teeth along the edges of the micromirror.

DETAILED DESCRIPTION OF THE PREFERRED EMBODIMENTS

A new degamma table compression and decompression technique has been developed that substantially reduces the non-volatile memory required to store degamma and other tables.

Figure 1:
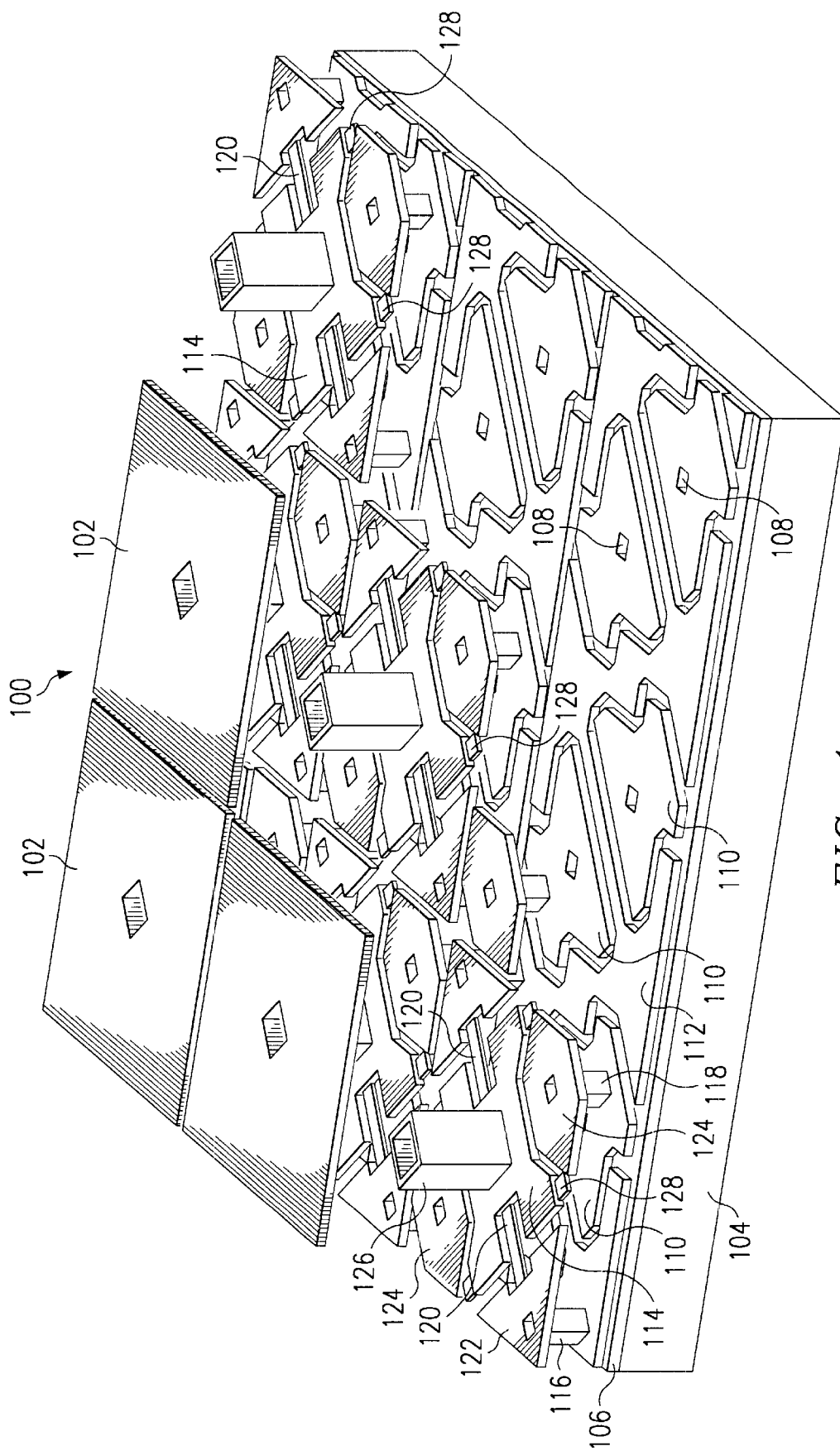
FIG. 1 is a perspective view of a small portion of a micromirror array of the prior art.

A typical hidden-hinge DMD 100 is actually an orthogonal array of DMD cells, or elements. This array often includes more than a thousand DMD rows and columns of DMDs. FIG. 1 shows a small portion of a DMD array of the prior art with several mirrors 102 removed to show the underlying mechanical structure of the DMD array. FIG. 2 is an exploded view of a single DMD element of the prior art further detailing the relationships between the DMD structures.

A DMD is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with, and typically underlying, each mirror 102 and digital logic circuits to control the transfer of the digital image data to the underlying memory cells. Voltage driver circuits to drive bias and reset signals to the mirror superstructure may also be fabricated on the DMD substrate, or may be external to the DMD. Image processing and formatting logic is also formed in the substrate 104 of some designs. For the purposes of this disclosure, addressing circuitry is considered to include any circuitry, including direct voltage connections and shared memory cells, used to control the direction of rotation of a DMD mirror.

Some DMD configurations use a split reset configuration which allows several DMD elements to share one memory cell—thus reducing the number of memory cells necessary to operate a very large array, and making more room available for voltage driver and image processing circuitry on the DMD integrated circuit. Split reset is enabled by the bistable operation of a DMD, which allows the contents of the underlying memory to change without affecting the position of the mirror 102 when the mirror has a bias voltage applied.

The silicon substrate 104 and any necessary metal interconnection layers are isolated from the DMD superstructure by an insulating layer 106 which is typically a deposited silicon dioxide layer on which the DMD superstructure is formed. Holes, or vias, are opened in the oxide layer to allow electrical connection of the DMD superstructure with the electronic circuitry formed in the substrate 104.

The first layer of the superstructure is a metalization layer, typically the third metalization layer and therefore often called M3. The first two metalization layers are typically required to interconnect the circuitry fabricated on the substrate. The third metalization layer is deposited on the insulating layer and patterned to form address electrodes 110 and a mirror bias connection 112. Some micromirror designs have landing electrodes which are separate and distinct structures but are electrically connects to the mirror bias connection 112. Landing electrodes limit the rotation of the mirror 102 and prevent the rotated mirror 102 or hinge yoke 114 from touching the address electrodes 110, which have a voltage potential relative to the mirror 102. If the mirror 102 contacts the address electrodes 110, the resulting short circuit could fuse the torsion hinges 116 or weld the mirror 102 to the address electrodes 110, in either case ruining the DMD.

Since the same voltage is always applied both to the landing electrodes and the mirrors 102, the mirror bias connection and the landing electrodes are preferably combined in a single structure when possible. The landing electrodes are combined with the mirror bias connection 112 by including regions on the mirror bias/reset connection 112, called landing sites, which mechanically limit the rotation of the mirror 102 by contacting either the mirror 102 or the torsion hinge yoke 114. These landing sites are often coated with a material chosen to reduce the tendency of the mirror 102 and torsion hinge yoke 114 to stick to the landing site.

Mirror bias/reset voltages travel to each mirror 102 through a combination of paths using both the mirror bias/reset metalization 112 and the mirrors and torsion beams of adjacent mirror elements. Split reset designs require the array of mirrors to be subdivided into multiple subarrays each having an independent mirror bias connection. The landing electrode/mirror bias 112 configuration shown in FIG. 1 is ideally suited to split reset applications since the DMD elements are easily segregated into electrically isolated rows or columns simply by isolating the mirror bias/reset layer between the subarrays. The mirror bias/reset layer of FIG. 1 is shown divided into rows of isolated elements.

A first layer of supports, typically called spacervias, is fabricated on the metal layer forming the address electrodes 110 and mirror bias connections 112. These spacervias, which include both hinge support spacervias 116 and upper address electrode spacervias 118, are typically formed by spinning a thin spacer layer over the address electrodes 110 and mirror bias connections 112. This thin spacer layer is typically a 1 $\mu$m thick layer of positive photoresist. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed from the device prior to device operation.

A thin layer of metal is sputtered onto the spacer layer and into the holes. An oxide is then deposited over the thin metal layer and patterned to form an etch mask over the regions that later will form hinges 120. A thicker layer of metal, typically an aluminum alloy, is sputtered over the thin layer and oxide etch masks. Another layer of oxide is deposited and patterned to define the hinge yoke 114, hinge cap 122, and the upper address electrodes 124. After this second oxide layer is patterned, the two metals layers are etched simultaneously and the oxide etch stops removed to leave thick rigid hinge yokes 114, hinge caps 122, and upper address electrodes 124, and thin flexible torsion beams 120.

A thick spacer layer is then deposited over the thick metal layer and patterned to define holes in which mirror support spacervias 126 will be formed. The thick spacer layer is typically a 2 $\mu$m thick layer of positive photoresist. A layer of mirror metal, typically an aluminum alloy, is sputtered on the surface of the thick spacer layer and into the holes in the thick spacer layer. This metal layer is then patterned to form the mirrors 102 and both spacer layers are removed using a plasma etch.

Once the two spacer layers have been removed, the mirror is free to rotate about the axis formed by the torsion hinge. Electrostatic attraction between an address electrode 110 and a deflectable rigid member, which in effect form the two plates of an air gap capacitor, is used to rotate the mirror structure. Depending on the design of the micromirror device, the deflectable rigid member is the torsion beam yoke 114, the beam or mirror 102, a beam attached directly to the torsion hinges, or a combination thereof. The upper address electrodes 124 also electrostatically attract the deflectable rigid member.

The force created by the voltage potential is a function of the reciprocal of the distance between the two plates. As the rigid member rotates due to the electrostatic torque, the torsion beam hinges resist deformation with a restoring torque which is an approximately linear function of the angular deflection of the torsion beams. The structure rotates until the restoring torsion beam torque equals the electrostatic torque or until the rotation is mechanically blocked by contact between the rotating structure and a fixed component. As discussed below, most micromirror devices are operated in a digital mode wherein sufficiently large bias voltages are used to ensure full deflection of the micromirror superstructure.

Micromirror devices are generally operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a fixed location on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion beam axis. Digital operation uses a relatively large voltage to ensure the mirror is fully deflected. Since it is advantageous to drive the address electrode using standard logic voltage levels, a bias voltage, typically a negative voltage, is applied to the mirror metal layer to increase the voltage difference between the address electrodes and the mirrors. Use of a sufficiently large mirror bias voltage—a voltage above what is termed the collapse voltage of the device—ensures the mirror will deflect to the closest landing electrodes even in the absence of an address voltage. Therefore, by using a large mirror bias voltage, the address voltages need only be large enough to deflect the mirror slightly.

To create an image using the micromirror device, the light source is positioned at an angle equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror is rapidly and repetitively rotated on and off. The duty cycle of the mirror determines the quantity of light reaching the image plane. The human eye integrates the light pulses and the brain perceives a flicker-free intermediate brightness level.

Full-color images are generated by using three micromirror devices to produce three single-color images, or by sequentially forming three single-color images using a single micromirror device illuminated by a beam of light passing through three color filters mounted on a rotating color wheel.

FIG. 3 is a side view of a micromirror device 302 coupled to a TIR prism assembly 304 of the prior art. In FIG. 3, light from a source enters a first prism 306 and is internally reflected by the interface between the prisms. The reflected light exits the prism 306 and strikes the DMD array 302 at an angle of incidence equal to twice the deflection angle of the mirrors. When the mirrors are rotated toward the illumination source, the reflected light follows a path normal to the surface of the micromirror device 302 and passes through both the first prism 306 and a compensation prism 308 without being reflected by the interface between the two. The light is focused onto an image plane to form an image.

Light striking pixels that are rotated away from the illumination source is reflected by the micromirror device at an angle equal to the angle of illumination plus twice the deflection angle of the micromirror. The illumination and projection paths are sometimes reversed, depending upon the desired placement of the projection lens and light source relative to the DMD.

FIG. 4 is a plan view of the micromirror array 302 and TIR prism assembly 304 of FIG. 3. The prism is illuminated from an angle of 45° relative to the edges of the micromirror array 302. The illumination angle of 45° chosen to achieve good contrast. This requires the TIR prism assembly 304 to be twisted relative to the DMD array 302, increasing the size of the projector housing. FIG. 5 shows a close-up of a few of the micromirrors 502 from the micromirror array 302 of FIG. 4. The axis of rotation 504 is also shown in FIG. 5. The 45° twist in FIG. 4 is due to the 45° rotation between the axis of rotation 504 and the edges 506 of the micromirrors 502 shown in FIG. 5.

Figure 6:
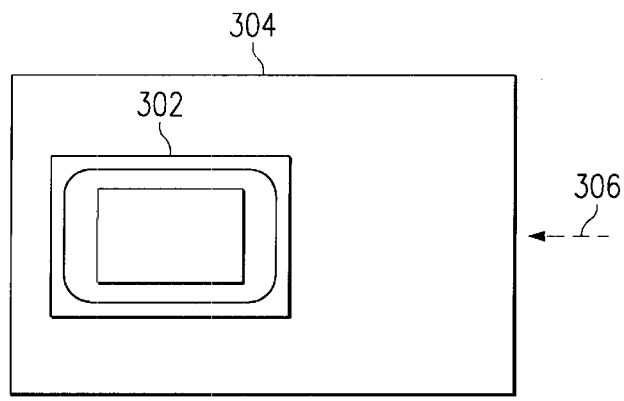
FIG. 6 is a plan view showing the alignment of a TIR prism and micromirror array for use with orthogonal illumination.

FIG. 6 shows a preferred alignment of the TIR prism assembly 304 and micromirror array 302. Comparing FIGS. 4 and 6 shows that aligning the TIR prism assembly 304 and the micromirror array 302 enables the use of a much smaller TIR prism assembly 304. Because the TIR prism must be made of high quality optical glass, the larger prism assembly is both significantly heavier and significantly more expensive.

Figure 7:
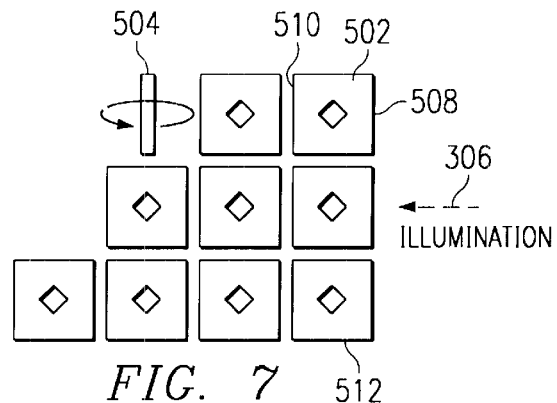
FIG. 7 is an enlarged view of a portion of the micromirror array of FIG. 6 showing the relationship between the illumination axis and the hinge axis.

FIG. 7 shows the alignment between the hinge axis 504 and the micromirrors 502 to enable the orthogonal illumination shown in FIG. 6. Compared to FIG. 5, the axis of rotation is rotated 45° in the micromirror array shown in FIG. 7. Unfortunately, the micromirror of FIG. 7 produces a low contrast image. The low contrast primarily is due to diffraction of the scattered light emerging from the pixel gaps by the leading 508 and trailing 510 edges of each micromirror 502. Because the sides of the mirror 512 produce a diffraction pattern that is strongest in the orthogonal dimension, much of the diffraction energy is collected by the projection lens.

Figure 8:
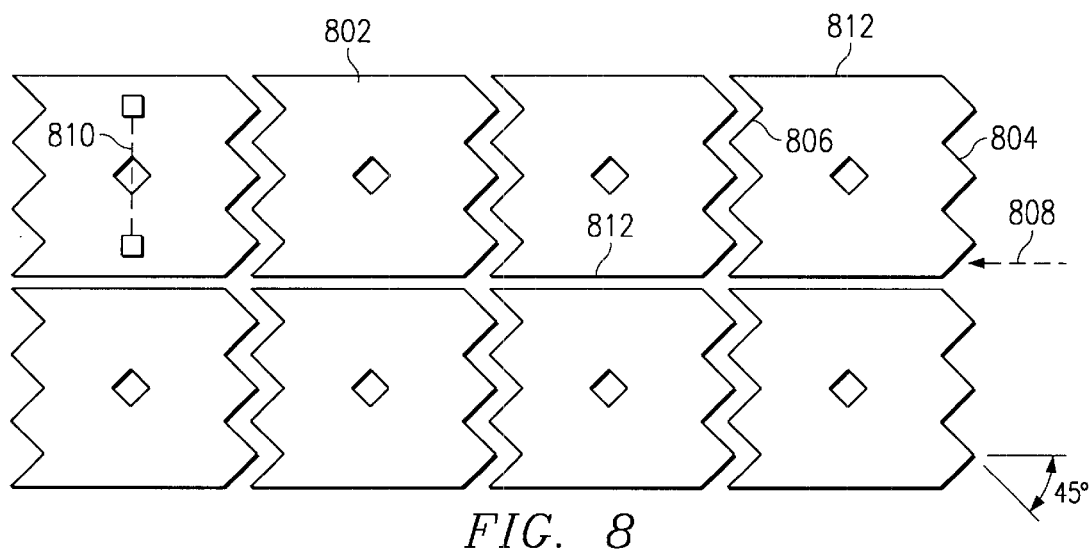
FIG. 8 is an enlarged view of a portion of a novel micromirror array designed to minimize diffraction while allowing orthogonal illumination of the pixels.

A novel solution to the diffraction problem of FIG. 7 is shown in FIG. 8. In FIG. 8, each mirror 802 is formed with a jagged leading 804 and trailing 806 edge. The side edges 812 of the micromirror are not perpendicular to the incident illumination 808 and need not be jagged. The jagged leading and trailing edges still cause diffraction, however the orientation of the "teeth" directs the diffracted energy away from the projection pupil. This improves the contrast compared to straight edges.

The leading and trailing edges preferably are formed as a series of saw teeth having a 45° angle to the incident illumination 808. Angles other than 45° are useful as well. Saw teeth are easily fabricated and do not disrupt the dynamics of the micromirrors. The number of saw teeth can vary, but the three-tooth pattern of FIG. 8 provides an optimum mixture of low diffraction and ease of production. Larger teeth risk becoming visible in the projected image. The image formed by the pixel should remain nearly square or rectangular. Smaller teeth cannot be detected by a viewer, but are more difficult to produce accurately. The teeth shown in FIG. 8, in which the leading and trailing edges have opposite recesses and extensions, provide a single interlocking mirror shape that simplifies design of the micromirror.

As shown in FIG. 8, the axis of rotation 810 is orthogonal to the incident illumination 808. Thus, the micromirror design shown in FIG. 8 enables use of the compact TIR prism assembly of FIG. 6. FIG. 10 is a plan view of an alternate mirror 1002 shape. In FIG. 10 the edges of the mirror 1002 have a 60° angle relative to the incident illumination 1008. The mirror 1002 of FIG. 10 has two and a half saw teeth on each side. FIG. 11 is a plan view of yet another micromirror element. The micromirror in FIG. 11 has four saw teeth along each edge.

FIG. 9 is a schematic view of an image projection system [800] 900 using an improved micromirror 902 according to the present invention. In FIG. 9, light from light source 904 is focused on the improved micromirror 902 by lens 906. Although shown as a single lens, lens 906 is typically a group of lenses and mirrors which together focus and direct light from the light source 904 onto the surface of the micromirror device 902. Image data and control signals from controller 914 cause some mirrors to rotate to an on position and others to rotate to an off position. Mirrors on the micromirror device that are rotated to an off position reflect light to a light trap 908 while mirrors rotated to an on position reflect light to projection lens 910, which is shown as a single lens for simplicity. Projection lens 910 focuses the light modulated by the micromirror device 902 onto an image plane or screen 912.

Thus, although there has been disclosed to this point a particular embodiment for orthogonal illumination of micromirror pixel arrays, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A micromirror array designed for orthogonal illumination, the micromirror comprising:
    a substrate;
    addressing circuitry formed on said substrate; and
    an array of deflectable mirror elements formed over said substrate, said deflectable mirror elements operable to rotate about an axis in response to said addressing circuitry, said axis substantially parallel to at least one of a leading and a trailing edge, at least one of said leading and trailing edges being jagged.

2. The micromirror array of claim 1, wherein said substrate is a semiconductor substrate.

3. The micromirror array of claim 1, wherein said substrate is a silicon substrate.

4. The micromirror array of claim 1, said addressing circuitry comprising a memory cell associated with each said deflectable mirror element.

5. The micromirror array of claim 1, said addressing circuitry comprising addressing electrodes formed on said substrate.

6. The micromirror array of claim 1, said leading edge comprising a series of saw teeth.

7. The micromirror array of claim 1, said leading edge comprising a series of three saw teeth.

8. The micromirror array of claim 1, said trailing edge comprising a series of saw teeth.

9. The micromirror array of claim 1, said trailing edge comprising a series of three saw teeth.

10. The micromirror array of claim 1, both said leading and said trailing edges comprising a series of saw teeth.

11. The micromirror array of claim 1, both said leading and said trailing edges comprising a series of three saw teeth.

12. A method of fabricating a micromirror array, the method comprising:
    providing a substrate;
    fabricating a micromirror support structure on said substrate, said micromirror support structure comprising a torsion hinge having an axis;
    forming a micromirror supported by said micromirror support structure, said micromirror supported by said torsion hinge and operable to rotate about said axis, said micromirror having a leading edge and a trailing edge, at least one of said leading and trailing edges being jagged and predominately parallel to said torsion hinge axis.

13. The method of claim 12, comprising:
    forming addressing circuitry on said substrate, said addressing circuitry comprising a memory cell associated with each said micromirror.

14. The method of claim 12, comprising:
    forming address electrodes on said substrate, at least one said address electrode associated with each said micromirror.

15. The method of claim 12, said forming step comprising:
    forming a micromirror supported by said micromirror support structure, said micromirror supported by said torsion hinge and operable to rotate about said axis, said micromirror having a leading edge and a jagged trailing edge, said leading edge comprising a series of saw teeth.

16. The method of claim 12, said forming step comprising:
    forming a micromirror supported by said micromirror support structure, said micromirror supported by said torsion hinge and operable to rotate about said axis, said micromirror having a leading edge and a jagged trailing edge, said leading edge comprising a series of three saw teeth.

17. The method of claim 12, said forming step comprising:

forming a micromirror supported by said micromirror support structure, said micromirror supported by said torsion hinge and operable to rotate about said axis, said micromirror having a leading edge and a jagged trailing edge, said trailing edge comprising a series of saw teeth.

18. The method of claim 12, said forming step comprising:

forming a micromirror supported by said micromirror support structure, said micromirror supported by said torsion hinge and operable to rotate about said axis, said micromirror having a leading edge and a jagged trailing edge, said trailing edge comprising a series of three saw teeth.

\* \* \* \* \*